US008818579B2

(12) United States Patent
Kashi et al.

(10) Patent No.: US 8,818,579 B2
(45) Date of Patent: Aug. 26, 2014

(54) SYSTEMS AND METHODS FOR GRAPHICALLY INDICATING AIRCRAFT ASCENT AND DESCENT CAPABILITIES

(75) Inventors: Rajanikanth Nagaraj Kashi, Bangalore (IN); Roger Rathbun, Bothell, WA (US); Scott Richard Gremmert, Redmond, WA (US); Dilip Mathews, Bangalore (IN); Nainatara Kumble, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 295 days.

(21) Appl. No.: 13/600,150

(22) Filed: Aug. 30, 2012

(65) Prior Publication Data
US 2014/0067171 A1    Mar. 6, 2014

(51) Int. Cl.
*G06F 7/70*      (2006.01)
*G01C 23/00*   (2006.01)
*G08G 5/00*     (2006.01)
*G05D 1/04*     (2006.01)

(52) U.S. Cl.
CPC .............. *G01C 23/00* (2013.01); *G08G 5/0039* (2013.01); *G05D 1/04* (2013.01)
USPC ................. 701/14; 701/4; 701/13; 244/158.1

(58) Field of Classification Search
CPC ..... G01C 23/00; G08G 5/0039; G08G 5/0021; G05D 1/04; G05D 1/00; B64G 1/66
USPC ................................ 701/4, 13, 14; 244/158.1
See application file for complete search history.

(56) References Cited

U.S. PATENT DOCUMENTS

| 3,243,803 | A * | 3/1966 | Thue ................................ 342/97 |
| 4,043,194 | A * | 8/1977 | Tanner ........................ 73/178 T |
| 6,683,541 | B2 * | 1/2004 | Staggs et al. ................... 340/961 |
| 7,408,552 | B2 * | 8/2008 | Kellman et al. ............... 345/440 |
| 2007/0174005 | A1 * | 7/2007 | Bitar et al. ..................... 701/211 |
| 2010/0332054 | A1 | 12/2010 | Brandao et al. | |
| 2011/0144833 | A1 | 6/2011 | Tjorhom et al. | |
| 2011/0224847 | A1 | 9/2011 | Singer et al. | |

* cited by examiner

*Primary Examiner* — Gertrude Arthur Jeanglaude
(74) *Attorney, Agent, or Firm* — Shumaker & Sieffert, P.A.

(57) ABSTRACT

Systems and methods are operable to present graphical information indicating capability of an aircraft to change altitude. An exemplary embodiment determines an altitude change capability of the aircraft; determines an altitude change capability icon based on the determined altitude change capability of the aircraft, wherein the altitude change capability icon is defined by at least a leading portion, a trailing portion, a top portion, and a bottom portion, wherein a slope of the leading portion of the altitude change capability icon corresponds to the determined altitude change capability of the aircraft, and wherein the leading portion and the trailing portion are separated by at least the top portion and the bottom portion; and communicates the altitude change capability icon to a display for presentation to the crew of the aircraft.

19 Claims, 7 Drawing Sheets

SYSTEMS AND METHODS FOR GRAPHICALLY INDICATING AIRCRAFT ASCENT AND DESCENT CAPABILITIES

BACKGROUND OF THE INVENTION

During flight, crew of an aircraft may wish to increase the flight level (altitude) of their aircraft. For example, they may wish to take advantage of favorable winds that may be found at higher altitudes, thereby improving fuel efficiency and/or reducing flight times. As another example, they may wish to ascend above terrain or weather that the aircraft is approaching.

However, the crew of the ascending aircraft must use their personal good judgment to gage when to initiate an ascent maneuver. That is, based on their understanding of the ascent capabilities of their aircraft, which is often learned over time, the crew must guess at a time to initiate the ascent so as to ensure that they ascend to the desired altitude in a timely manner.

However, many factors can affect the ascent capability of the aircraft. For example, prevailing wind speed and direction in the airspace that the aircraft is ascending through can alter the ascent capability of the aircraft. Weight of the aircraft can also affect the ascent capability of the aircraft. As yet another example, the current speed of the aircraft at the current altitude may have an effect on the remaining available engine thrust that might be used in the ascent maneuver.

Accordingly, there is a need in the arts to assist the crew of the ascending aircraft to better appreciate the ascent capability of their aircraft.

SUMMARY OF THE INVENTION

Systems and methods of presenting graphical information indicating capability of an aircraft to change altitude are disclosed. An exemplary embodiment determines an altitude change capability of the aircraft; determines an altitude change capability icon based on the determined altitude change capability of the aircraft, wherein the altitude change capability icon is defined by at least a leading portion, a trailing portion, a top portion, and a bottom portion, wherein a slope of the leading portion of the altitude change capability icon corresponds to the determined altitude change capability of the aircraft, and wherein the leading portion and the trailing portion are separated by at least the top portion and the bottom portion; and communicates the altitude change capability icon to a display for presentation to the crew of the aircraft.

BRIEF DESCRIPTION OF THE DRAWINGS

Preferred and alternative embodiments are described in detail below with reference to the following drawings.

DETAILED DESCRIPTION OF THE PREFERRED EMBODIMENT

Systems and methods of graphically presenting ascent capability of an aircraft to the crew are disclosed. Embodiments of the aircraft altitude change capability estimator system 100 are operable to identify, determine, or estimate altitude change capability (ascent or descent capability) of the aircraft based on a variety of factors. An example factor is aircraft attribute parameter that affects the ability of the aircraft to change altitude, such as weight or air speed.

The ascent capability of the aircraft may be determined for a current time based on attributes of the aircraft and/or based on current flight conditions. Embodiments may be optionally configured to adjust the altitude change capability estimations of the aircraft for future times as aircraft attributes and/or flight conditions change. Also, embodiments of the aircraft altitude change capability estimator system 100 may be operable to consider nearby weather conditions. Further, embodiments of the aircraft altitude change capability estimator system 100 may be configured to graphically present altitude change capability icons on a display which graphically illustrates ascent and/or descent limitations. Accordingly, the crew may then better appreciate the performance capabilities of their aircraft when they perform an ascent maneuver or a descent maneuver.

In some embodiments, a traffic collision avoidance system (TCAS) may be operable to determine the location, bearing, altitude, and/or airspeed of the other nearby aircraft. In such embodiments, an altitude change capability icon may be determined based on the location of another aircraft identified by the TCAS. That is, the TCAS may be used to define ascent/descent capability of the aircraft. For example, if another aircraft is above the installation aircraft, the ascent capability may be limited to indicate an ascent capacity that is less than the theoretical or estimated maximum ascent capability. Similarly, if another aircraft is below the installation aircraft, the descent capability may be limited to indicate a descent capacity that is less than the theoretical or estimated maximum descent capability.

Figure 1:
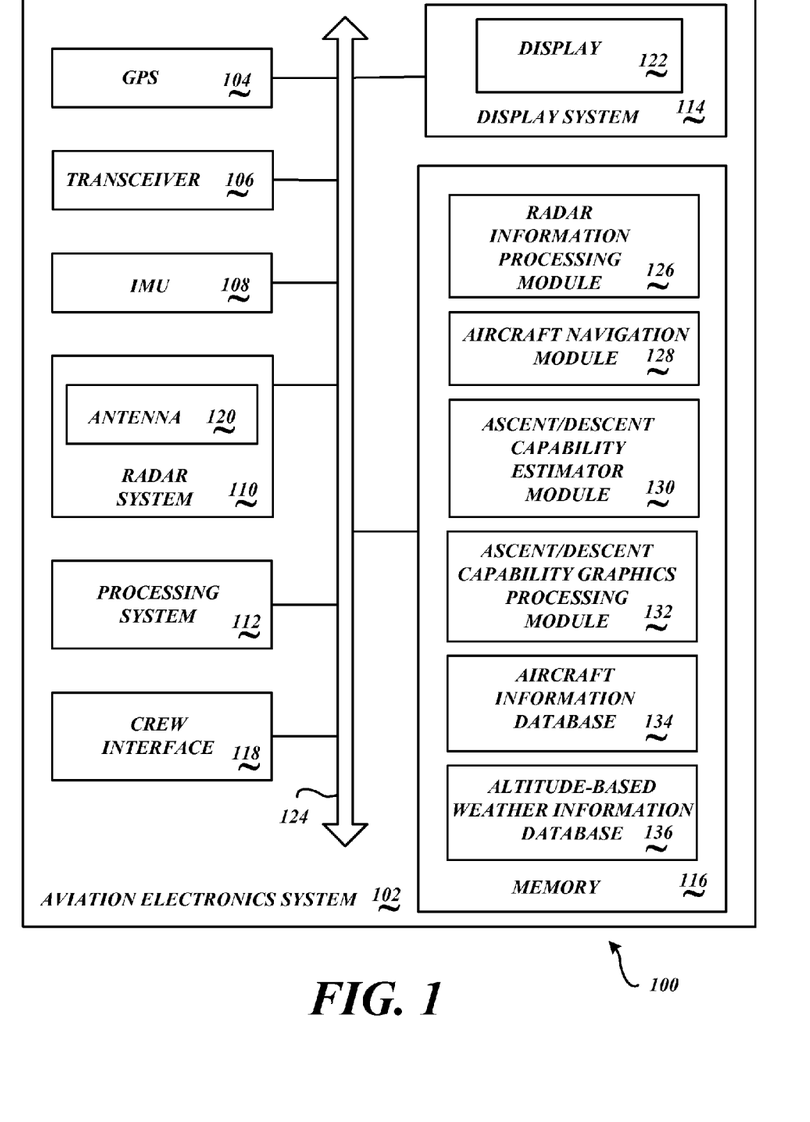
FIG. 1 is a block diagram of an embodiment of an aircraft altitude change capability estimator system.

FIG. 1 is a block diagram of an embodiment of the aircraft altitude change capability estimator system 100 implemented in an aviation electronics system 102 of an installation aircraft. The aviation electronics system 102 includes a global positioning system (GPS) 104, a transceiver 106, an inertial measurement unit (IMU) 108, a radar system 110, a processing system 112, a display system 114, a memory 116, and a crew interface 118. The radar system 110 includes an antenna 120. The display system 114 includes a display 122. It is appreciated that the aviation electronics system 102 includes many other components and/or systems that are not illustrated or described herein.

The above-described components, in an exemplary embodiment, are communicatively coupled together via communication bus 124. In alternative embodiments of the aviation electronics system 102, the above-described components may be communicatively coupled to each other in a different manner. For example, one or more of the above-described components may be directly coupled to the processing system 112, or may be coupled to the processing system 112 via intermediary components (not shown).

The memory 116 comprises portions for storing a radar information processing module 126, an aircraft navigation module 128, an ascent/descent capability module 130, an ascent/descent capability graphics processing module 132. In some embodiments, the processing module 126, the aircraft navigation module 128, the ascent/descent capability module 130, and/or the ascent/descent capability graphics processing module 132 may be integrated with other logic, may be integrated into other modules, or reside in other memories (not shown). In other embodiments, some or all of these memory and other data manipulation functions in the various modules may be provided by other electronic devices suitably connected to the aviation electronics system 102. For example, one or more of the modules may be implemented in an electronic flight bag (EFB). Modules 126, 128, 130, 132 residing in the memory 116 are retrieved and executed by the processing system 112 or another suitable processing system.

In an exemplary embodiment, an aircraft information database 134 and/or an altitude-based weather information database 136 may be stored in the memory 116. Further, the databases 134 and/or 136 may be implemented with other databases, may be implemented in various formats, such as a buffer or the like, and/or may be implemented in another memory (not shown).

Other aircraft altitude change capability estimator system 100 embodiments may include some, or may omit some, of the above-described flight information processing components. Further, additional components not described herein may be included in alternative embodiments.

The memory 116 may be any suitable memory device or system. Depending upon the embodiment, the memory 116 may be a dedicated memory system, may be part of another component or system, and/or may be a distributed memory system. The memory 116 may also include other logic, modules and/or databases not illustrated or described herein.

The GPS 104 is configured to receive a plurality of satellite signals which permit the aircraft navigation module 128 to accurately determine the installation aircraft's current location, and optionally, determine the installation aircraft's altitude. The IMU 108 comprises a system of accelerometers, gyroscopes and the like that are configured to sense movement of the installation aircraft. Based on the sensed movement, the aircraft navigation module 128 may accurately determine the installation aircraft's location, bearing, altitude, and/or airspeed.

The transceiver 106 is configured to receive communications from multiple nearby aircraft. The received communications include information pertaining to the weather conditions that the installation aircraft may be ascending through. Other weather condition information, such as prevailing wind speeds or the like, may be received from ground stations.

The radar system 110 may be any suitable radar system, such as, but not limited to, a weather radar that is operable to detect weather that is located relatively far away from the installation aircraft and/or to detect nearby aircraft. The radar system 110 includes an antenna 120 that is operable to emit radar signals and receive radar returns. A radar return is reflected energy from an object upon which the emitted radar pulse is incident on. The antenna 120 is swept in a back-and-forth motion, in an up and down direction, and/or in other directions of interest, such that the radar system 110 is able to detect weather and/or other aircraft, in an area of interest about the installation aircraft.

The crew interface 118 is configured to receive various operating instructions from the crew of the installation aircraft. For example, the crew may control presentation of determined ascent capability on the display 122 or on another display device.

The radar information processing module 126 processes radar returns detected by the antenna 120 of the radar system 110. Various types of weather, and their associated attributes, are determined by the radar information processing module 126. Additionally, location and/or altitude of other nearby aircraft may be determined based on the processed radar returns. Further, the radar information processing module 126 may generate a displayable image corresponding to a graphical presentation of the weather information and/or nearby aircraft. The displayable image may be communicated to the display system 114 for presentation on the display 122 or another suitable display.

The ascent/descent capability module 130 is configured to process various information so that ascent capability of the installation aircraft can be determined. Further, the ascent/descent capability module 130 is configured modify estimated ascent capability of the aircraft based on changing aircraft attributes and/or flight conditions.

The ascent/descent capability graphics processing module 132 is configured to generate a displayable presentation of the altitude change capability, or ascent/descent capability, of the aircraft determined by the ascent/descent capability module 130 by presenting an altitude change capability icon. The ascent/descent capability graphics processing module 132 prepares an image indicating ascent capability of the aircraft which may be graphically depicted on the display 222 or on another suitable display device using a suitable altitude change capability icon. For example, an image presenting ascent capability information may be presented on the display of an EFB. Alternatively, or additionally, some installation aircraft may have a plurality of displays 122 in the cockpit, wherein different information may be presented on different displays 122.

Figure 2:
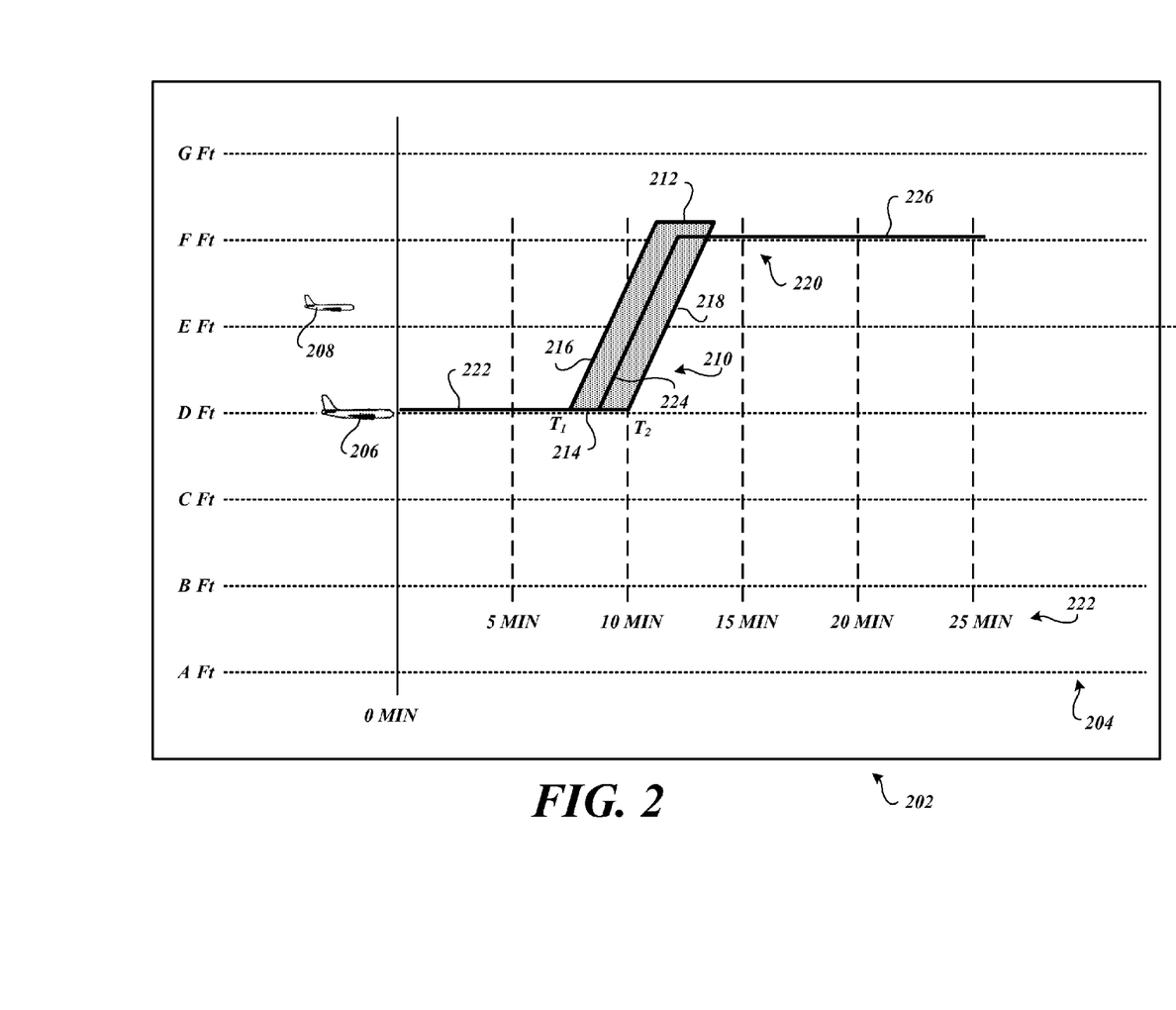
FIG. 2 is a simplified example two-dimensional screen shot that graphically illustrates ascent capability of the aircraft to the crew.
Figure 3:
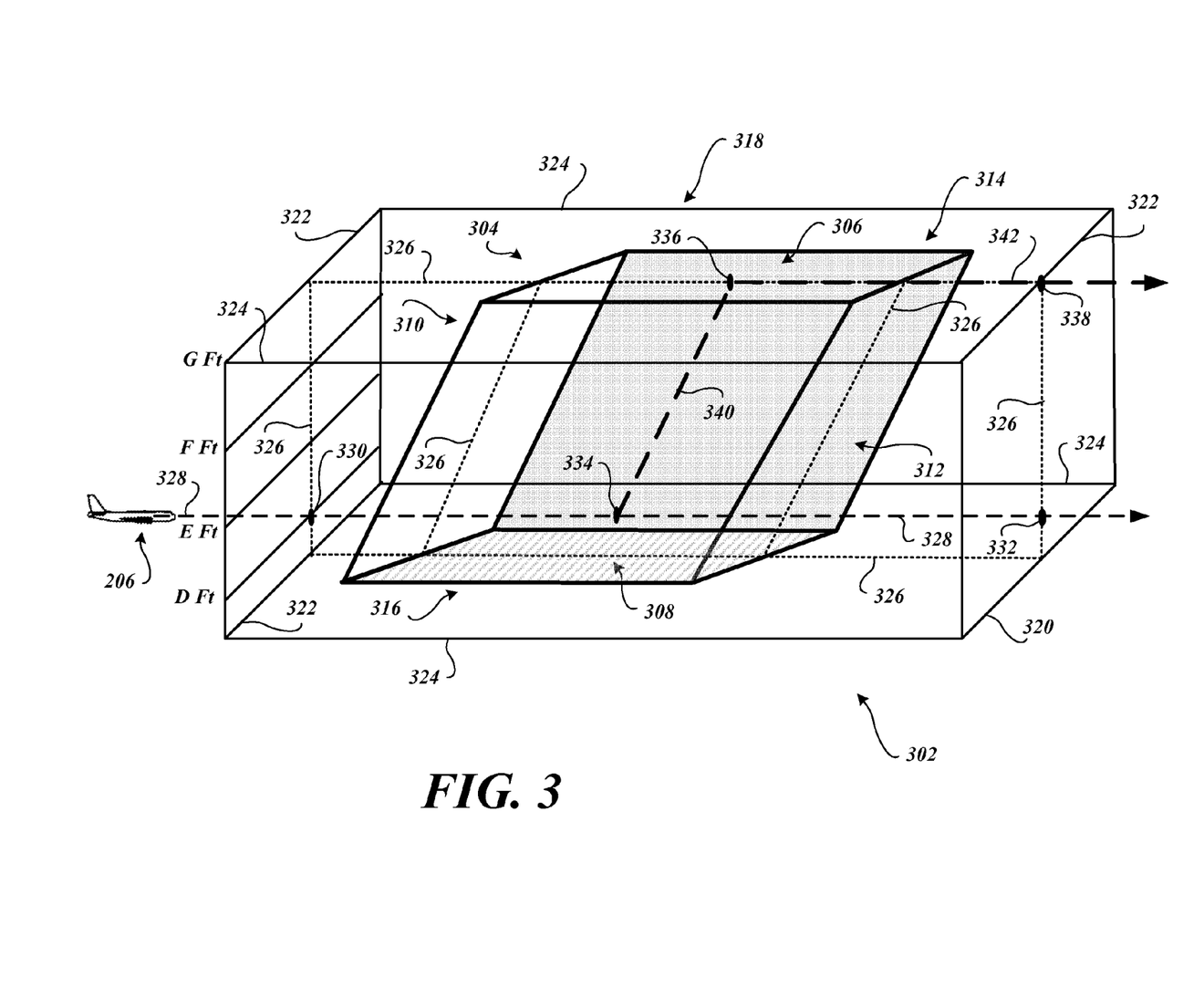
FIG. 3 is a simplified example three-dimensional screen shot that graphically illustrates ascent capability of the aircraft to the crew.
Figure 4:
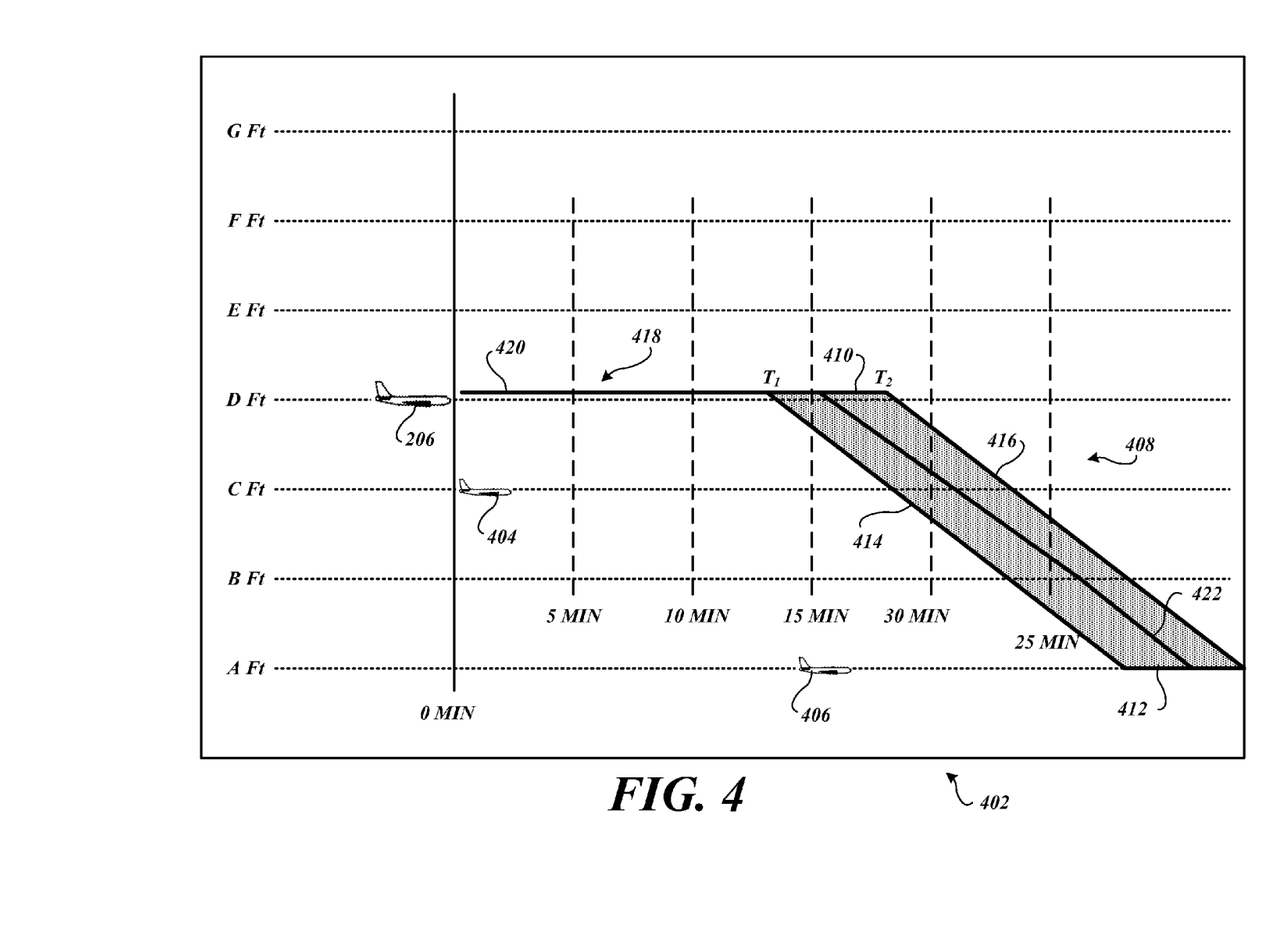
FIG. 4 simplified example two-dimensional screen shot that graphically illustrates descent capability of the aircraft to the crew.
Figure 5:
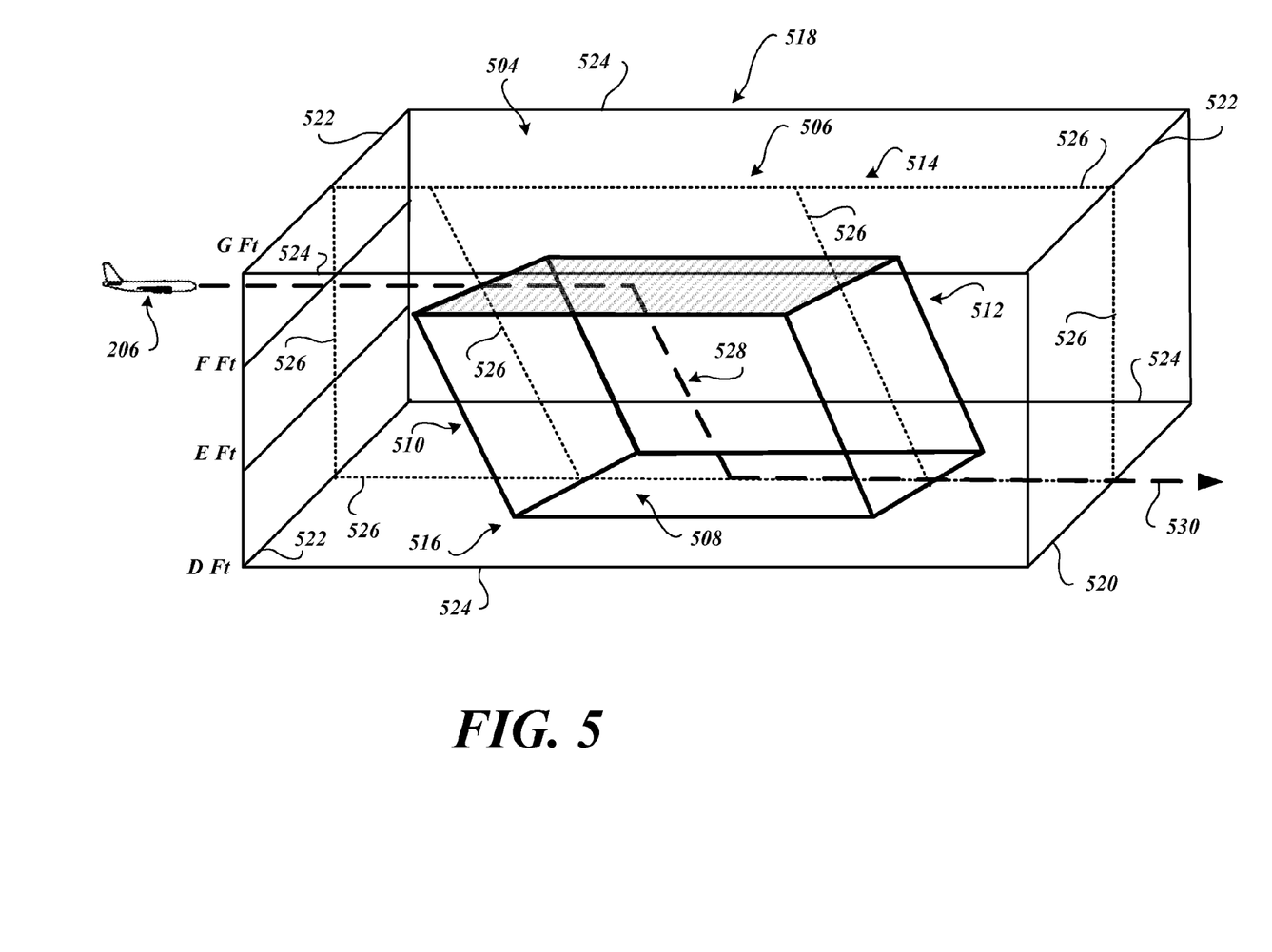
FIG. 5 is a simplified example three-dimensional screen shot that graphically illustrates descent capability of the aircraft to the crew.

FIG. 2 is a simplified example two-dimensional screen shot 202 that graphically illustrates ascent capability of the aircraft to the crew. FIG. 3 is a simplified example three-dimensional screen shot 302 that graphically illustrates ascent capability of the aircraft to the crew. FIG. 4 is a simplified example two-dimensional screen shot 402 that graphically illustrates descent capability of the aircraft to the crew. FIG. 5 is a simplified example three-dimensional screen shot 502 that graphically illustrates descent capability of the aircraft to the crew The screen shots 202, 302, 402, 502 may be displayed on the display 122, the display of an EFB, or on another suitable display device. The screen shots 202, 302, 402, 502 may illustrate a plurality of altitude lines 204 along a vertical axis which represent aircraft altitude in feet, though any altitude metric may be used. For illustration purposes, the numeric values of the altitudes of the screen shots 202, 402 are labeled with the letters "A" through "G" feet.

In the simplified example of FIG. 2, the crew of the installation aircraft 206 wish to ascend to an altitude of "F" feet. In some situations, there may be time constraints in which the crew must complete the ascent maneuver. For example, the crew may be implementing an In-Trail procedure (ITP) ascent maneuver in an airspace occupied by a plurality of other aircraft, such as the aircraft 208. The aircraft 208 is an automatic dependent surveillance broadcast (ADS-B) equipped aircraft which periodically broadcast flight information that is receivable by the aircraft 206. Alternatively, or additionally, the radar system 110 (FIG. 1) onboard the aircraft 206 may also be operable to determine the location, bearing, altitude, and/or airspeed of the nearby aircraft 208.

Embodiments of the aircraft altitude change capability estimator system 100 generate an ascent capability icon 210 (generically an altitude change capability icon) that graphically illustrates the ascent capability of their aircraft 206. The ascent capability icon 210 is represented as, or is defined by, a rhomboid having a top edge 212, a bottom edge 214, a leading edge 216 and a trailing edge 218 (wherein the edges are generically referred to as portions of the icon 210). The rhomboid shape of the ascent capability icon 204 is readily visible on the display and effectively imparts information about the ascent capability of their aircraft to the crew. Some embodiments may use a line or very thin icon, however such icons may be relatively hard to the crew to discern on the screen shot 202.

In the various embodiments, a grade or slope of the leading edge 216 of the rhomboid corresponds to the current ascent capabilities of the ascending aircraft 206. The trailing edge 218 of the rhomboid may also be sloped to correspond to the current ascent capabilities of the ascending aircraft 206.

Alternatively, or additionally, the grade or slope of the leading edge 216 and/or trailing edge 218 may correspond to a predefined value. For example, the aircraft ascent capability of the aircraft 206 may be a predefined rate of ascent that is based on a regulatory-specified maximum ascent rate value, may be based on an ascent rate that is comfortable for the crew or passengers, or may be based on an ascent rate that is appropriate for the cargo that the aircraft 206 may be carrying. The predefined aircraft ascent capability may be stored in the memory 116 or may be specified by the crew of the aircraft 206 via the crew interface 118. Similarly, aircraft descent capabilities of the aircraft 206 may be predefined and used when descent maneuvers are desired.

Optionally, the ascent capability icon 204 defines a time range in which the aircraft 206 may initiate the ascent maneuver. The leading edge 216 of the ascent capability icon 210 is associated with a flight time of $t_1$. That is, the time $t_1$ indicates the soonest time that the crew may initiate the ascent maneuver. The trailing edge 218 of the ascent capability icon 210 is associated with a flight time of $t_2$. That is, the time $t_2$ indicates the latest time that the crew may initiate the ascent maneuver. The times $t_1$ and $t_2$ may be specified by the crew or automatically determined. For example, ITP opportunity windows may identify safe times when the crew may ascend to a desired altitude. The times $t_1$ and $t_2$ would indicate to the crew when they may safely initiate the ITP ascent maneuver.

In some situations, attributes of the aircraft 206 and/or flight conditions may change as a function of time. For example, the aircraft may become lighter as fuel is consumed, thereby potentially increasing the ability of the aircraft 206 to ascend. Alternatively, or additionally, wind speeds may change at different ranges from the aircraft 206, which may effectively slow down or speed up the aircraft, thereby potentially changing the ability of the aircraft 206 to ascend. In such situations, the slope or grade of the leading edge 216 may be different from the slope or grade of the trailing edge 218 of the ascent capability icon 204. Accordingly, the ascent capability icon 204 may appear as a trapezoid shaped icon.

Also optionally included is an elevational flight path line 220 on the screen shot 202. The elevational flight path line 220 indicates altitude and location of the aircraft 206 when it substantially follows a flight path corresponding to the recommended ascent indicated by the ascent capability icon 204. That is, if the crew of the aircraft 206 execute the ascent maneuver in accordance with the ascent capability icon 204, the vertical flight path of the aircraft 206 will be approximated by the presented elevational flight path line 220.

The elevational flight path line 220 comprises a first elevational flight path line portion 222 that is horizontal up to a point in time/distance which corresponds to the ascent indicated by the ascent capability icon 204. Then, a second elevational flight path line portion 224 illustrates a first path of ascent of the aircraft 206 up to the altitude of "F" feet. The grade or slope of the elevational flight path line portion 224 may, in some embodiments, correspond to the current ascent capabilities of the ascending aircraft 206 or to another predefined value. A third elevational flight path line portion 226 is a horizontal portion which indicates that the aircraft 206 will arrive at and then level off at the desire altitude of "F" feet.

In some embodiments, presentation of the elevational flight path line 220 is optional. That is, the crew may selectively present or selectively omit the elevational flight path line 220 from the screen shot 202. Further, in some embodiments, if the crew wishes to ascend using another rate of ascent, a new elevational flight path line corresponding to that particular ascent maneuver may be determined and then be presented on the screen shot 202.

In the simplified example of FIG. 3, the crew of the installation aircraft 206 wish to ascend to an altitude of "G" feet. Embodiments of the aircraft altitude change capability estimator system 100 generate an ascent capability icon 304 (generically an altitude change capability icon) that graphically illustrates the ascent capability of their aircraft 206 in three dimensions. The ascent capability icon 304 is represented as, or is defined by, a three dimensional rhomboid having a top surface 306, a bottom surface 308, a leading surface 310 and a trailing surface 312 (wherein the surfaces are generically referred to as portions of the icon 304). The three dimensional rhomboid further includes a left side surface 314 and a right side surface 316.

The three dimensional rhomboid shape of the ascent capability icon 304 is readily visible on the display and effectively imparts information about the ascent capability of their aircraft to the crew. One or more of the various surfaces 306, 308, 310, 312, 314, and 316 may be shaded, may be colored, and/or may be presented with various intensities to enhance the visibility of the ascent capability icon 304.

Some embodiments may use various artifacts on the screen shot 302 to enhance the perception of the crew that the screen shot 302 is presenting information in three dimensions. For example, a cube or other suitable curvilinear three dimensional artifact 318 may be used to indicate the extent of the airspace that is presented on the screen shot 302. The later extent of the three dimensional artifact 318 may be indicated by the relative length of the edges 320, 322. Textual distance information may be optionally presented on the screen shot 302 to indicate the distance of lateral length of the airspace represented by the edges 320, 322. In some embodiments, the length of the edges 320, 322 may be different and/or may be curvilinear.

In some embodiments, the length of the edge 324 indicates the range out from the aircraft 206 that is represented by the airspace represented by the three dimensional artifact 318. Textual distance information may be optionally shown on the screen shot 302 to indicate the distance of airspace represented by the edge 324. In some embodiments, the edges 324 may be parallel to each other and/or may be divergent from each other.

In some embodiments, other artifacts may be shown which appear to define a vertical slice of airspace of the three dimensional artifact 318 and/or of the ascent capability icon 304. For example, but not limited to, dotted lines 326 are shown on the surfaces of the three dimensional artifact 318 and the ascent capability icon 304 to indicate the vertical slice of airspace that is in alignment with the current bearing of the aircraft 206. In some embodiments, the dotted lines 326 or other indicating artifacts are presented to indicate a planned path of flight for the aircraft 206.

Other artifacts, such as the example dashed line 328, may be used to indicate a bearing of the current path of flight for the aircraft 206. An optional entry point 330 is indicated where the aircraft 206 will enter the represented airspace. The optional exit point 332 indicates where the aircraft 206 will exit the represented airspace if the aircraft 306 does not change altitude and/or bearing. However, if the crew of the aircraft 206 indicates that they intend to effect an ascent up to the "G" feet altitude at a range as indicated by the point 334, and do ascend in accordance with the indicated ascent capabilities of the aircraft 206, the aircraft will arrive at the "G" feet altitude at a range corresponding to the indicated point 336. Afterwards, the aircraft 206 would be estimated to exit the airspace of the three dimensional artifact 318 at the point 338.

Also optionally included is an elevational flight path line 340 on the screen shot 202 (using the bold-dashed line). The elevational flight path line 340 indicates altitude and location of the aircraft 206 if it substantially follows a flight path corresponding to the ascent indicated by the ascent capability icon 304. That is, if the crew of the aircraft 206 execute the ascent maneuver in accordance with the ascent capability icon 304, the vertical flight path of the aircraft 206 will be approximated by the presented elevational flight path line 340. When the aircraft 206 arrives at and levels off at the "G" feet altitude, the projected flight path may be further indicated by the line portion 342.

In the simplified example of FIG. 4, the crew of the installation aircraft 206 wish to descend to an altitude of "A" feet. In some situations, there may be time constraints in which the crew must complete the descent maneuver, such as when implementing an In-Trail procedure (ITP) descent maneuver in an airspace occupied by a plurality of other aircraft, such as the aircraft 404, 406. The aircraft 404, 406 are automatic dependent surveillance broadcast (ADS-B) equipped aircraft which periodically broadcast flight information that is receivable by the aircraft 206. Alternatively, or additionally, the radar system 110 (FIG. 1) onboard the aircraft 206 is also operable to determine the location, bearing, altitude, intent information and/or airspeed of the nearby aircraft 404, 406.

Embodiments of the aircraft altitude change capability estimator system 100 generate a descent capability icon 408 (generically an altitude change capability icon) that graphically illustrates the descent capability of their aircraft 206. The descent capability icon 408 is represented as, or is defined by, a rhomboid having a top edge 410, a bottom edge 412, a leading edge 414 and a trailing edge 416 (wherein the edges are generically referred to as portions of the icon 408). In some embodiments, the descent capability icon 408 may be represented as, or is defined by, a three dimensional rhomboid similar to the above-described ascent capability icon 304.

The rhomboid shape of the descent capability icon 408 is readily visible on the display and effectively imparts information about the descent capability of their aircraft to the crew. Some embodiments may use a line or very thin icon, however such icons may be relatively hard to the crew to discern on the screen shot 402.

Here, descent capability of the aircraft 206 may or may not be defined based on descent characteristics of the aircraft 206. Rather, the descent capability of the aircraft 206 may be defined based on other factors, such as, but not limited to, a descent rate that is comfortable for the crew or passengers, may be based on a descent rate that is appropriate for the cargo that the aircraft 206 may be carrying, or may be based on a regulatory-specified maximum descent rate value. The predefined aircraft descent capability may be stored in the memory 116 or may be specified by the crew of the aircraft 206 via the crew interface 118.

Alternatively, the slope of the descent capability icon 408 may be determined based on a planned flight path or other criteria. For example, if an ITP descent maneuver is being performed in view of the aircraft 404, 406, the descent capability icon 408 may be defined so as to indicate a recommended flight path wherein the aircraft 206-maintains safe separation distances from the aircraft 404, 406 during its ITP descent maneuver.

Optionally, the descent capability icon 408 defines a time range in which the aircraft 206 may initiate the descent maneuver. The trailing edge 416 of the descent capability icon 408 is associated with a flight time of $t_1$. That is, the time $t_1$ indicates the soonest time that the crew may initiate the descent maneuver. The leading edge 414 of the descent capability icon 408 is associated with a flight time of $t_2$. That is, the time $t_2$ indicates the latest time that the crew may initiate the descent maneuver. The times $t_1$ and $t_2$ may be specified by the crew or automatically determined. For example, ITP opportunity windows may identify safe times when the crew may descend to a desired altitude. The times $t_1$ and $t_2$ would indicate to the crew when the may safely initiate the ITP descent maneuver.

Also optionally included is an elevational flight path line 418 on the screen shot 402. The elevational flight path line 418 indicates altitude and location of the aircraft 206 when it substantially follows a flight path corresponding to the recommended descent indicated by the descent capability icon 408. That is, if the crew of the aircraft 206 execute the descent maneuver in accordance with the descent capability icon 408, the vertical flight path of the aircraft 206 will be approximated by the presented elevational flight path line 418.

The elevational flight path line 418 comprises a first elevational flight path line portion 420 that is horizontal up to a point in time/distance which corresponds to the descent indicated by the descent capability icon 408. Then, a second elevational flight path line portion 422 illustrates a first path of descent of the aircraft 206 down to the altitude of "A" feet. The grade or slope of the elevational flight path line portion 422 may correspond to the predefined value.

In some embodiments, presentation of the elevational flight path line 418 is optional. That is, the crew may selectively present or selectively omit the elevational flight path line 418 from the screen shot 402. Further, in some embodiments, if the crew wishes to descend using another rate of descent, a new elevational flight path line corresponding to that particular descent maneuver may be determined and then be presented on the screen shot 402.

In the simplified example of FIG. 5, the crew of the installation aircraft 206 wish to descend from an altitude of "F" feet to an altitude of "D" feet. Embodiments of the aircraft altitude change capability estimator system 100 generate a descent capability icon 504 (generically an altitude change capability icon) that graphically illustrates the descent capability of their aircraft 206 in three dimensions. The descent capability icon 504 is represented as, or is defined by, a three dimensional rhomboid having a top surface 506, a bottom surface 508, a leading surface 510 and a trailing surface 512 (wherein the surfaces are generically referred to as portions of the icon 504). The three dimensional rhomboid further includes a left side surface 514 and a right side surface 516.

The three dimensional rhomboid shape of the descent capability icon 504 is readily visible on the display and effectively imparts information about the descent capability of their aircraft to the crew. One or more of the various surfaces 506, 508, 510, 512, 514, and 516 may be shaded, may be colored, and/or may be presented with various intensities to enhance the visibility of the descent capability icon 504.

Some embodiments may use various artifacts on the screen shot 502 to enhance the perception of the crew that the screen shot 502 is presenting information in three dimensions. For example, a cube or other suitable curvilinear three dimensional artifact 518 may be used to indicate the extent of the airspace that is presented on the screen shot 502. The later extent of the three dimensional artifact 518 may be indicated by the relative length of the edges 520, 522. Textual distance information may be optionally presented on the screen shot 502 to indicate the distance of lateral length of the airspace represented by the edges 520, 522. In some embodiments, the length of the edges 520, 522 may be different and/or may be curvilinear.

In some embodiments, the length of the edge 524 indicates the range out from the aircraft 206 that is represented by the airspace represented by the three dimensional artifact 518. Textual distance information may be optionally shown on the screen shot 502 to indicate the distance of airspace represented by the edge 524. In some embodiments, the edges 524 may be parallel to each other and/or may be divergent from each other.

In some embodiments, other artifacts may be shown. For example, but not limited to, other artifacts may be shown which appear to define a vertical slice of airspace of the three dimensional artifact 518 and/or of the descent capability icon 504. For example, but not limited to, dotted lines 526 are shown on the surfaces of the three dimensional artifact 518 and the descent capability icon 504 to indicate the vertical slice of airspace that is in alignment with the current bearing of the aircraft 206. In some embodiments, the dotted lines 526 or other indicating artifacts are presented to indicate a planned path of flight for the aircraft 206.

Also optionally included is an elevational flight path line 528 on the screen shot 202 (using the bold-dashed line). The elevational flight path line 528 indicates altitude and location of the aircraft 206 if it substantially follows a flight path corresponding to the descent indicated by the descent capability icon 504. That is, if the crew of the aircraft 206 execute the descent maneuver in accordance with the descent capability icon 504, the vertical flight path of the aircraft 206 will be approximated by the presented elevational flight path line 528. When the aircraft 206 arrives at and levels off at the "D" feet altitude, the projected flight path may be further indicated by the line portion 530

Figure 6:
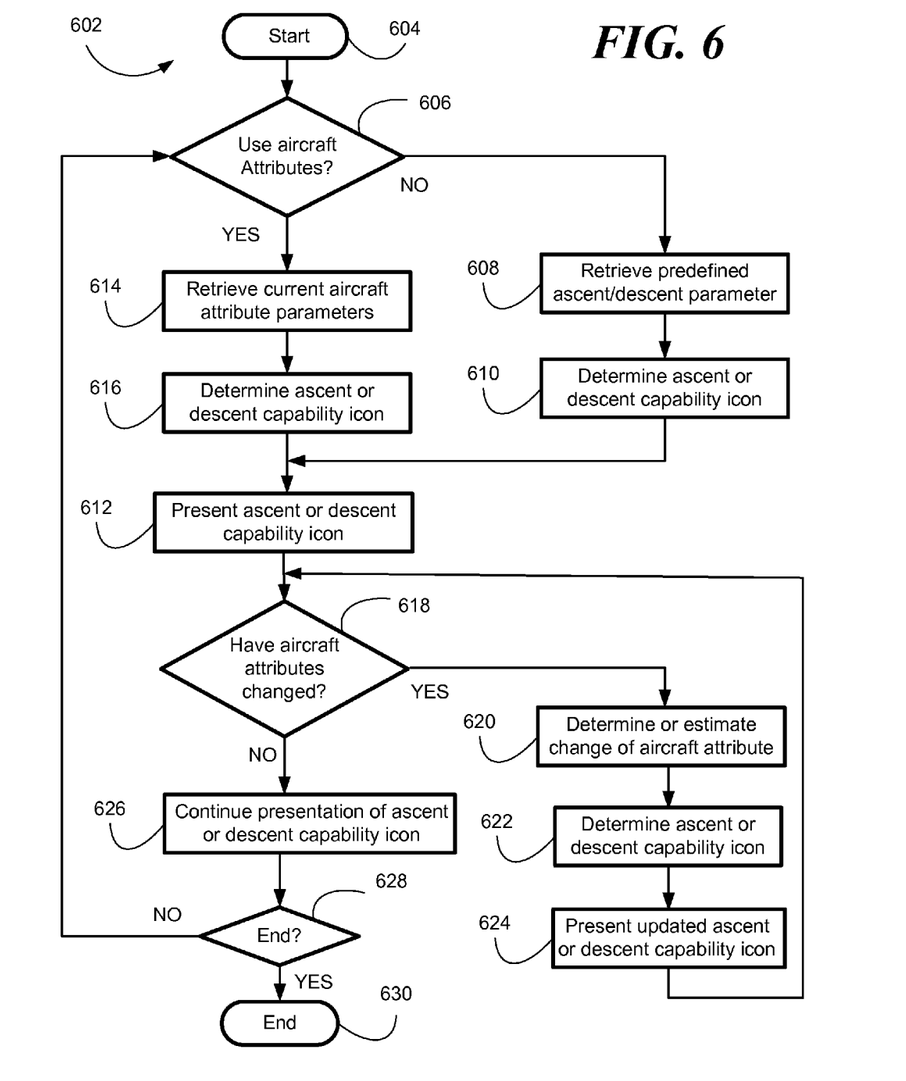
FIG. 6 is a flowchart illustrating the operation of the aircraft altitude change capability estimator system.

FIG. 6 is a flowchart 602 illustrating the operation of the aircraft altitude change capability estimator system 100. The flowchart 602 shows the functionality and operation of a possible implementation of software for implementing the aircraft altitude change capability estimator system 100. In this regard, each block may represent a module, segment, or portion of code, which comprises one or more executable instructions for implementing the specified logical function(s). It should also be noted that in some alternative implementations, the functions noted in the blocks may occur out of the order noted in FIG. 6, may include additional functions, and/or may omit some functions. For example, two blocks shown in succession in FIG. 6 may in fact be executed substantially concurrently, the blocks may sometimes be executed in the reverse order, or some of the blocks may not be executed in all instances, depending upon the functionality involved. All such modifications and variations are intended to be included herein within the scope of this disclosure.

With respect to FIG. 6, the process of the flow chart 602 starts at block 604, for example, in response to the starting or powering up of the aircraft altitude change capability estimator system 100. Alternatively, the process may start in response to a signal from the crew interface 118 (FIG. 1) indicating that the crew of the aircraft 206 is intending to implement, or is inquiring about, ascent/descent maneuver opportunities.

At block 606, a determination is made whether aircraft attributes are to be used to determine the ascent/descent capabilities of the aircraft 206. If not (the NO condition), then predefined ascent/descent capabilities of the aircraft 206 are to be used. At block 608, the predefined ascent/descent parameters are retrieved from the memory 116 or another suitable memory, or are received as inputs from the crew via the crew interface 118. At block 610, ascent/descent capability icons are determined. The process proceeds to block 612 wherein the determined ascent/descent capability icons are presented to the crew of the aircraft 206 on the display 122 or on another suitable display.

If at block 606 the aircraft attributes are to be used to determine the ascent/descent capabilities of the aircraft 206, the process proceeds to block 614. At block 614, current aircraft attribute parameters are retrieved from the memory 116.

An example aircraft attribute parameter is the lift characteristics provided from the wings of the aircraft 206 as a function or airspeed. Based on the current airspeed of the aircraft 206, a lift value may be determined and then used to determine the ascent/descent capability icon at block 616.

Available remaining engine thrust may also impact lift characteristics provided from the wings of the aircraft 206 in that the speed of the aircraft 206 may be increased by increasing engine thrust. Accordingly, a maximum lift may be determined based on the potential to increase the speed of the aircraft 206. The determined potential maximum speed of the aircraft, a lift value may be determined and then used to determine the ascent/descent capability icon at block 616.

Weight of the aircraft 206 is an attribute that may also impact lift characteristics provided from the wings of the aircraft 206 in that the weight of the aircraft 206 affects the gravitational force which counteracts lift. Accordingly, a weight may be determined. Then, a lift value may be determined therefrom and then used to determine the ascent/descent capability icon at block 616.

In the various embodiment, multiple aircraft attribute parameters may be considered together to define ascent/descent capability icons. Once the ascent/descent capabilities of the aircraft 206 have been determined at block 616, the process proceeds to block 612 wherein the determined ascent/descent capability icons are presented to the crew of the aircraft 206.

After presentation of the ascent/descent capability icons at block 612, the process proceeds to block 618. At block 618, a determination is made whether any aircraft attributes have significantly changed. In some embodiments, aircraft attributes may be computed periodically based on the dynamics of the aircraft to determine if such aircraft attributes have significantly changed. If one or more attributes have significantly changed (the YES condition), the process proceeds to block 620 where changes of the attributes are determined or estimated.

For example, prevailing wind speeds and/or direction may have changed. A change in wind speed or direction will impact airspeed of the aircraft 206. Accordingly, the change in wind speed and/or direction may be used to determine or estimate the current lift and/or a maximum lift. Based on the determined current lift and/or a maximum lift of the aircraft 206, a lift value may be determined and then used to determine an updated ascent/descent capability icon at block 622.

Other weather conditions may be considered. For example, a storm cell or other inclement weather may prevent a change in altitude to the specified altitude of interest. The ascent/descent capability icons may be modified to indicate the extent of an acceptable altitude change in view of the inclement weather, or may be omitted in the regions of airspace that are in proximity to the inclement weather.

As another example, weight of the aircraft 206 may significantly change as fuel is consumed. Fuel consumption information may be obtained in real time from sensors, such as a fuel gauge or the like, onboard the aircraft 206. A change in weight will impact airspeed of the aircraft 206. Accordingly, the changed weight may be used to determine or estimate the current lift and/or a maximum lift. Based on the determined current lift and/or a maximum lift of the aircraft 206, a lift value may be determined and then used to determine an updated ascent/descent capability icon at block 622.

At block 624, the updated ascent/descent capability icons are presented to the crew of the aircraft 206 on the display 122 or on another suitable display.

If at block 618 the aircraft attributes have not significantly changed (the NO condition), the ascent/descent capability icons are continued to be presented to the crew, as indicated at block 626. The process continues to block 628 where a determination is made whether the process of presenting ascent/descent capability icons is to end. If the process is to end (the YES condition), the process ends at block 630. If the process is to continue, an example embodiment loops back up to block 606 to continue the process. Other embodiment may loop back up to other blocks.

Figure 7:
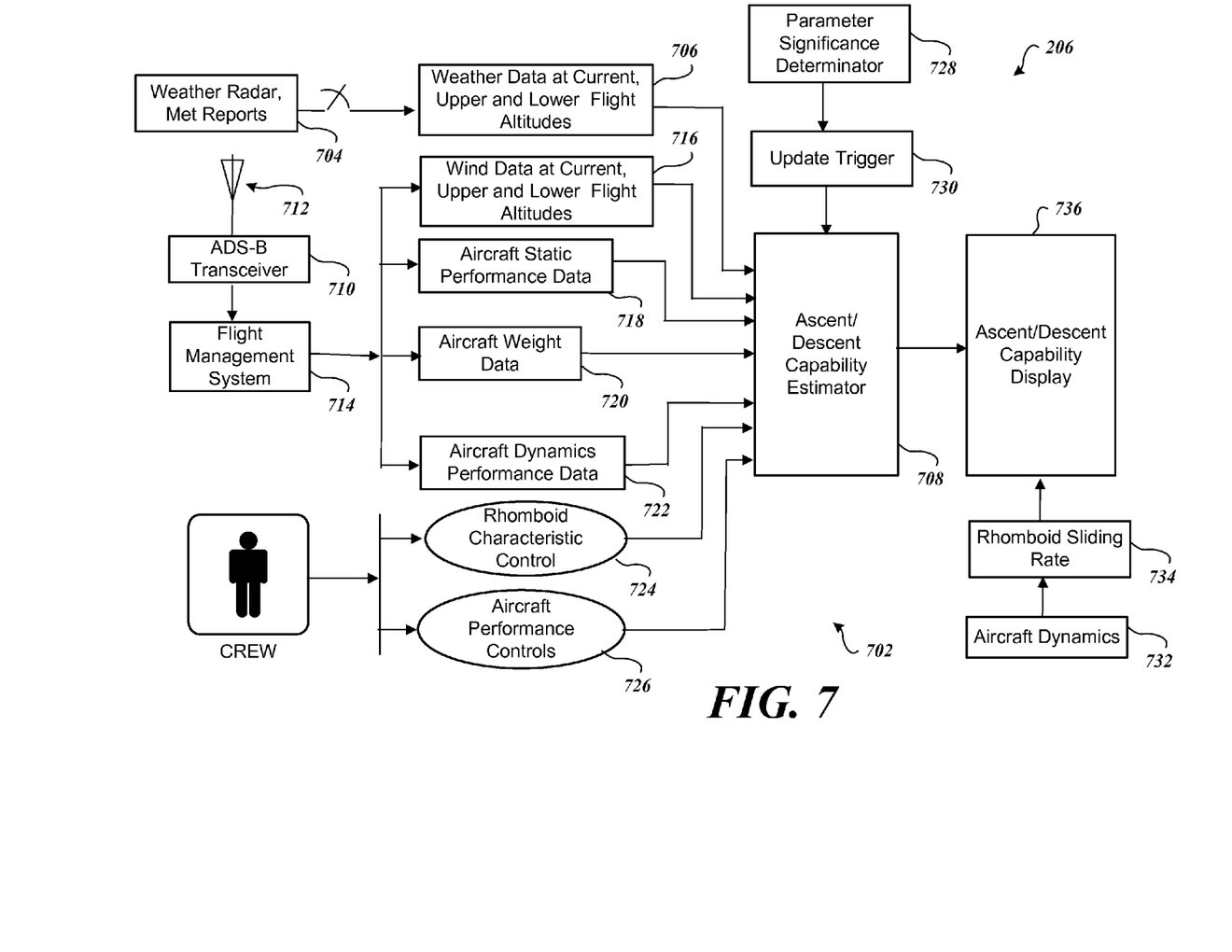
FIG. 7 is a schematic block diagram of an embodiment of the aircraft altitude change capability estimator system.

FIG. 7 is a schematic block diagram 702 of an embodiment of the aircraft altitude change capability estimator system 100. Alternative embodiments may include other schematic elements, and/or the schematic elements may be interconnected with each other in alternative configurations. The functionality of the various schematic elements of FIG. 7 are implemented by the modules 126, 128, 130, 132 residing in the memory 116 (FIG. 1) and/or by other logic.

A first example input schematic element 704 corresponds to weather radar information and/or other meteorological (Met) reports that may be received from the onboard weather radar system and/or that may be received from external sources, such as other aircraft and/or ground stations. Received weather information is stored, as indicated by the schematic element 706. The stored weather information is retrieved by the ascent/descent capability estimator 708 when ascent/descent capabilities are determined.

A second example input schematic element corresponds to the ADS-B transceiver 710 that receives communications, at the antenna 712, from multiple nearby aircraft. The received communications include information pertaining to the broadcasting nearby aircraft, such as current bearing, altitude, airspeed, and/or location. In some embodiments, the received ADS-B information may be input into a flight management system 714 onboard the aircraft 206. Alternatively, the received ADS-B information may be input directly into another schematic element of the aircraft altitude change capability estimator system 100. The received ADS-B information may include weather related information provided by the broadcasting aircraft, as indicated by the schematic element 716.

The flight management system 714 may also provide aircraft static performance data, as indicated by the schematic element 718. The aircraft static performance data is static information that does not change for the aircraft 206. For example, but not limited to, example static data may include a maximum thrust value for each engine.

Aircraft weight data may also be computed, as indicated by the schematic element 720. Such aircraft weight data typically changes during flight, such as when fuel is consumed. For example, but not limited to, example weight data may include actual or estimated weight of cargo, passengers, and/or crew.

The flight management system 714 may also provide aircraft dynamics performance data, as indicated by the schematic element 722. For example, dynamic characteristics of the aircraft 206 may change during flight as weight of the aircraft 206 changes, as prevailing winds change, as altitude of the aircraft 206 changes, etc.

Another example input corresponds to information specified by the crew of the aircraft 206. The crew may specify or control specific characteristics of a presented ascent/descent rhomboid, as indicated by the schematic element 724.

In some embodiments, the crew may input performance controls of the aircraft 206, as indicated by the schematic element 726. For example, the crew may input a time that a planned speed change and or altitude change is to occur.

Another input is the parameter significance determinator, as indicated by the schematic element 728. For example, updated changes in the weight of fuel consumed by the aircraft 206 may not be significant enough to cause a significant change to aircraft dynamics. Accordingly, ascent/descent capabilities would remain substantially constant. On the other hand, the weight change may be enough to significantly affect aircraft ascent/descent capabilities. Accordingly, ascent/descent capabilities would be recomputed.

Another input is the update trigger rate, as indicated by the schematic element 730. This update trigger ensures that ascent or descent capabilities are determined or estimated based on the most current information available.

Another input is the aircraft dynamics, as indicated by the schematic element 732. The aircraft dynamic information ensures that ascent or descent capabilities are identified based on the desired ascent or descent limits, or is based on ascent capabilities, of the aircraft 206. For example, a predefined descent rate may be used to define a descent capability. Alternatively, an ascent capability may be determined based on the maximum rate of ascent which may be achieved by the aircraft 206 based on its dynamics.

The schematic element 734 may predict, and then adjust, the screen shots which present the determined ascent/descent rhomboids. For example, but not limited to, the screen shots may be slid (moved) in relation to current speed of the aircraft 206 so that the crew is viewing relevant ascent/descent rhomboids.

The various inputs are provided to the ascent/descent capability estimator 708 so that the resulting screen shots with the ascent/descent maneuver rhomboid may be generated and then communicated to a display, as indicated by the schematic element 736

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method that presents graphical information indicating capability of an aircraft to change altitude, the method comprising:
   determining an altitude change capability of the aircraft;
   determining an altitude change capability icon based on the determined altitude change capability of the aircraft,
      wherein the altitude change capability icon is defined by at least a leading portion, a trailing portion, a top portion, and a bottom portion,
      wherein a slope of the leading portion of the altitude change capability icon corresponds to the determined altitude change capability of the aircraft, and
      wherein the leading portion and the trailing portion are separated by at least the top portion and the bottom portion; and
   communicating the altitude change capability icon to a display for presentation to the crew of the aircraft.

2. The method of claim 1, wherein the altitude change capability icon is presented as a two dimensional trapezoid, wherein the leading portion, the trailing portion, the top portion and the bottom portion are corresponding edges of the presented two dimensional trapezoid.

3. The method of claim 1, wherein the altitude change capability icon is presented as a three dimensional trapezoid, wherein the leading portion, the trailing portion, the top portion and the bottom portion are corresponding surfaces of the presented two dimensional trapezoid.

4. The method of claim 1, wherein one of the top portion and the bottom portion of the altitude change capability icon is presented at an altitude that corresponds to a specified altitude.

5. The method of claim 1, wherein one of the top portion and the bottom portion of the altitude change capability icon is presented at a current altitude of the aircraft.

6. The method of claim 1, further comprising:
   receiving information corresponding to a desired altitude change, wherein the desired altitude change is specified by the crew of the aircraft, and wherein the altitude change capability is estimated based on the specified desired altitude.

7. The method of claim 1, further comprising:
   receiving information corresponding to a current speed of the aircraft, and wherein the altitude change capability is estimated based on the current speed.

8. The method of claim 1, further comprising:
   receiving information corresponding to a desired speed of the aircraft, wherein the desired speed is specified by the crew of the aircraft, and wherein the altitude change capability is estimated based on the specified desired speed.

9. The method of claim 1, when the altitude change is an ascent, the slope of the leading portion of the altitude change capability icon corresponds to a maximum ascent capability of the aircraft.

10. The method of claim 1, when the altitude change is an ascent, the slope of the leading edge of the altitude change capability icon corresponds to a predefined ascent rate of the aircraft.

11. The method of claim 1, when the altitude change is a descent, the slope of the leading edge of the altitude change capability icon corresponds to a predefined descent rate of the aircraft.

12. The method of claim 1, further comprising:
   receiving information corresponding to a change in prevailing wind speed in proximity to the aircraft;
   determining an updated altitude change capability icon based on the change in prevailing wind speed; and
   communicating the updated altitude change capability icon to the display for presentation to the crew of the aircraft.

13. The method of claim 1, further comprising:
   receiving information corresponding to a change in a weight of the aircraft;
   determining an updated altitude change capability icon based on the change in weight; and
   communicating the updated altitude change capability icon to the display for presentation to the crew of the aircraft.

14. The method of claim 1, wherein a slope of the trailing portion of the altitude change capability icon corresponds to the altitude change capability of the aircraft.

15. The method of claim 1, further comprising:
   determining an elevational flight path line that indicates altitude and location of the aircraft if the aircraft substantially follows a flight path corresponding to change in altitude indicated by the altitude change capability icon; and
   incorporating the elevational flight path line into the altitude change capability icon.

16. A system configured present graphical information indicating capability of an aircraft to change altitude, the system comprising:
   a user interface configured to receive information corresponding to a desired change in altitude;
   a memory configured to store aircraft attribute parameters, wherein the aircraft attribute parameters affect the ability of the aircraft to change altitude; and
   a processing system communicatively coupled to the user interface and the memory, wherein the processing system is configured to:
      determine an altitude change capability of the aircraft based on the stored aircraft attribute parameters;
      determine an altitude change capability icon based on the determined altitude change capability of the aircraft,
         wherein the altitude change capability icon is defined by at least a leading portion, a trailing portion, a top portion, and a bottom portion,
         wherein a slope of the leading portion of the altitude change capability icon corresponds to the determined altitude change capability of the aircraft, and
         wherein the leading portion and the trailing portion are separated by at least the top portion and the bottom portion; and
   a display system communicatively coupled to the processing system and configured to receive the altitude change capability icon from the processing system, wherein the altitude change capability icon is presentable on a display of the display system.

17. The system of claim 16, the altitude change capability icon is presented as a two dimensional trapezoid, wherein the leading portion, the trailing portion, the top portion and the bottom portion are corresponding edges of the presented two dimensional trapezoid.

18. The system of claim 16, the altitude change capability icon is presented as a three dimensional trapezoid, wherein the leading portion, the trailing portion, the top portion and the bottom portion are corresponding surfaces of the presented two dimensional trapezoid.

19. The system of claim 16, the altitude change capability icon is determined based on the location of another aircraft identified by a traffic collision avoidance system (TCAS).

\* \* \* \* \*